(12) United States Patent
Zakrzewski (10) Patent No.: US 7,203,716 B2
(45) Date of Patent: Apr. 10, 2007

(54) METHOD AND APPARATUS FOR FAST INTERPOLATION OF MULTI-DIMENSIONAL FUNCTIONS WITH NON-RECTANGULAR DATA SETS

(75) Inventor: Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 750 days.

(21) Appl. No.: 10/631,934

(22) Filed: Jul. 31, 2003

(65) Prior Publication Data

US 2004/0103132 A1 May 27, 2004

Related U.S. Application Data

(60) Provisional application No. 60/429,053, filed on Nov. 25, 2002.

(51) Int. Cl.
*G06F 7/38* (2006.01)
(52) U.S. Cl. ..................................... 708/290
(58) Field of Classification Search ................. 708/290
See application file for complete search history.

(56) References Cited

U.S. PATENT DOCUMENTS 5,966,140 A * 10/1999 Popovic et al. ............. 345/441
6,144,773 A * 11/2000 Kolarov et al. ............. 708/203
6,473,746 B1 10/2002 Zakrzewski
6,587,104 B1 * 7/2003 Hoppe ........................ 345/423
6,697,520 B1 * 2/2004 Hemingway ................ 382/166

OTHER PUBLICATIONS

Methods of Inferring Rotorcraft Gross Weight by Tim Flynn, Robert Hess, and Barbara Noble, published at 2003 IEEE Aerospace Conference from Mar. 9-14, 2003, IEEE paper No. is 1240.

* cited by examiner

*Primary Examiner*—Mary Steelman
*Assistant Examiner*—Chat C. Do
(74) *Attorney, Agent, or Firm*—Muirhead and Saturnelli, LLC (57) ABSTRACT

Interpolation techniques are described for use with data that may not be uniform and may be characterized as scattered. Such data may be obtained in instances where data acquisition may not be easily controlled such as in obtaining experimental data for use with models. Data interpolation techniques may be used in connection with the experimental data to produce a more complete and accurate data set representative of a variety of conditions using as input the non-uniform or scattered data. Such data sets may be used in a variety of applications including providing a realistic and complete set of data for training and verifying neural networks.

38 Claims, 8 Drawing Sheets

METHOD AND APPARATUS FOR FAST INTERPOLATION OF MULTI-DIMENSIONAL FUNCTIONS WITH NON-RECTANGULAR DATA SETS

RELATED APPLICATIONS

This application claims priority to U.S. Provisional Patent Application No. 60/429,053, (now expired) filed on Nov. 25, 2002, which is herein incorporated by reference in its entirety.

BACKGROUND OF THE INVENTION

1. Technical Field

This application relates to data generation, and more particularly to interpolation techniques used in data generation.

2. Description of Related Art

A physical or engineering system may be modeled based on experimental data. The experimental data may be limited in a variety of different ways since it may be difficult to obtain such data. For example, the experimental data may represent an incomplete or limited set of conditions and measurements. The experimental data may also be characterized as scattered and non-uniform. Interpolation techniques may be used to generate additional data based on the experimental data. However, irregularly scattered experimental data may limit the utilization of some interpolation techniques.

The problem complexity may increase as the number of dimensions of the data set increases. Existing interpolation techniques, such as Delaunay tesselation, may not be scalable for use with larger data dimensions. As the dimensionality of the data increases, the costs associated with the computation and storage may become prohibitive.

Some interpolation techniques, such as the nearest neighbor, may be more readily scaleable for use with larger data dimensions due to their speed and more modest memory requirements. However, these techniques may have other drawbacks, such as introducing larger interpolation errors and sensitivity to scaling of data sets. For example, using the nearest neighbor interpolation technique with different scaling factors for the same data point may result in different nearest neighbors being determined for the same data point.

It may be desirable, therefore, to have an interpolation technique that may use as input non-uniform and scattered data to efficiently generate additional data for a desired set of conditions. It may also be desirable to have an interpolation technique that is scalable for use with larger data dimensions while reducing the storage and computational costs as compared with existing techniques.

SUMMARY OF THE INVENTION

In accordance with one aspect of the invention is a method for performing interpolation of a point of interest producing an approximated function value of said point of interest using an input data set. Distances between said point of interest and points in said input data set are determined. The distances are sorted. A predetermined number of points in said input data set are selected which are closest to said point of interest in accordance with said distances. It is determined whether said point of interest is one of: enclosed within a simplex and on a boundary of the simplex. The simplex is formed by a combination of n+1 points selected from said predetermined number of points. The n+1 points form vertices of said simplex and n is a dimension of points in said input data set. If there is a simplex enclosing said point of interest or including said point of interest on its boundary, a linear surface is fit to said vertices of said simplex in accordance with a linear function. The linear function is evaluated at said point of interest to determine said approximated function value representing the approximation of said linear function at said point of interest.

In accordance with another aspect of the invention is a computer program product for performing interpolation of a point of interest producing an approximated function value of said point of interest using an input data set comprising: executable code that determines distances between said point of interest and points in said input data set; executable code that sorts said distances; executable code that selects a predetermined number of points in said input data set which are closest to said point of interest in accordance with said distances; executable code that determines whether said point of interest is one of: enclosed within a simplex and on a boundary of the simplex, said simplex formed by a combination of n+1 points selected from said predetermined number of points, said n+1 points forming vertices of said simplex, n being a dimension of points in said input data set; and executable code that, if there is a simplex enclosing said point of interest or including said point of interest on its boundary, fits a linear surface to said vertices of said simplex in accordance with a linear function, and evaluating said linear function at said point of interest to determine said approximated function value representing the approximation of said linear function at said point of interest.

BRIEF DESCRIPTION OF DRAWINGS

Features and advantages of the present invention will become more apparent from the following detailed description of exemplary embodiments thereof taken in conjunction with the accompanying drawings in which.

DESCRIPTION OF EMBODIMENT(S)

Neural networks may be used to model various conditions, such as those described herein in connection with estimation of aircraft weight as well as a wide variety of other conditions. Part of effectively utilizing a neural network includes properly training the neural network using a good set of training data. It may be desirable to have the training data cover an entire range of expected inputs. However, it may not be possible to generate such data sets. In practice, it may be the case that only sparse experimental data is available making it difficult to properly train and verify the neural network. The sparse experimental data may not cover the desired range of input conditions. Interpolation techniques may be used to generate additional data. However, the particular interpolation techniques available for use may be dependent on the characteristics of the actual experimental data from which additional data is generated. For example, the experimental data may be characterized as not uniform and scattered limiting the use of certain interpolation techniques that may be better suited for use with more uniform data. The available interpolation techniques may be further limited by the data dimensionality of the model since particular interpolation techniques may not be practically used with data dimensions as described elsewhere herein in more detail.

A majority of interpolation methods may be characterized as primarily suited for use with data points arranged in a regular rectangular grid, or data that may be characterized as generally uniform and regularly structured. That is, for example, suppose that each data point consists of an n-dimensional vector x and a scalar y. For the i-th coordinate of a vector x, the measurements available for each of $m_i$ discrete values are: $x_i(1), x_i(2), \ldots, x_i(n_i-1), x_i(m_i)$. Then, measurement or experimental data is also available for each combination of all discrete values $x(k_1, k_2, \ldots, k_n)=[x_1(k_1), x_2(k_2), \ldots, x_n(k_n)]$ making the total number of available measurements in the experimental data equal to the product of numbers $m_i$. For example, if the data were two-dimensional (n=2), for uniform data sets there are $m_1$ distinct values for the first coordinate of x, $m_2$ distinct values for the second coordinate of x, a total number of data points represented as $m=m_1 m_2$, and all measurement values may be arranged into a two-dimensional array y(i, j), with i=1, . . . , $m_1$, j=1, . . . , $m_2$. Similarly, if the data were three-dimensional (n=3), for uniform data sets there are $m_1$ distinct values for the first coordinate of x, $m_2$ distinct values for the second coordinate of x, $m_3$ distinct values for the third coordinate of x, a total number of data points represented as $m=m_1 m_2 m_3$, and all measurement values may be arranged into a three-dimensional array y(i, j, k), with i=1, . . . , $m_1$, j=1, . . . , $m_2$, k=1, . . . , $m_3$. More generally, for an n-dimensional case, there are $m=m_1 m_2 \ldots m_1$ measurement values arranged into an n-dimensional array $y(j_1, j_2, \ldots, j_n)$, with $j_i=1, \ldots, m_1$. Interpolation techniques may be used to estimate a value of the function for some intermediate value of x within the bounds given by limits $x_i(1)$ and $x_i(m_i)$, for example, assuming that the discrete values for each coordinate of x are increasing.

Different existing techniques used for interpolation of data described as above that may be characterized as regularly structured data include, for example, the multi-linear method, cubic method, and cubic spline method. Such methods are based on finding a hyper-rectangular cell of the grid containing the point x and then fitting a local approximating function whose values at the cell vertices are given by tabulated values of y. It should be noted that the size of an n-dimensional data table may grow quickly with respect to n, which may limit applicability of these interpolation approaches. Moreover, the use of these particular interpolation approaches may be better suited for use with regular or uniform experimental data set generation.

It may be desirable to use interpolation techniques over data, as described above, that does not display a regular, uniform or rectangular structure as may be the case when utilizing experimental data. For example, assume that variables x may be measured but cannot be set to arbitrary values. Let the collected data set consist of m pairs (x(k), y(k)), k=1, . . . , m, such that the particular coordinate values $x_i$ (k) need not be the same for any two measurement points. Interpolation of scattered data may be more difficult in that certain interpolation techniques may not be suitable for use with such data. For example, one embodiment of a software product called Matlab provides only two such methods within its griddatan function for use with such non-uniform scattered data. These two such methods are known as the nearest neighbor interpolation and linear interpolation based on Delaunay tessellation.

Advantages of the nearest neighbor approach are its speed and modest memory requirements and it scales quite easily to higher data dimensions. However, the nearest neighbor method may generate data points that are not sufficiently accurate and may result in a piecewise-constant interpolated function that is discontinuous along lines equidistant from two nearest neighboring points. Therefore applicability of nearest neighbor interpolation may be limited to instances in which collected data is relatively dense to limit the size of any discontinuity. Additionally, the nearest neighbor technique is sensitive with respect to scaling of the coordinates of x such that two different nearest neighbors may be generated for a same data point x in instances each having different scaling.

Linear interpolation on Delaunay simplices results in an interpolation function that is everywhere continuous. The method is based on tessellation of the data set into disjoint simplices (n-dimensional polyhedra with n+1 vertices) such that a hypersphere circumscribed on vertices of any one simplex does not contain any other data point. Such tessellation is unique. Within each simplex, a linear function is fit such that its values at vertices are equal to the corresponding measurement values. In other words, linear functions fitted within neighboring simplices coincide on their boundaries, thus resulting in the overall surface being continuous. Therefore, the Delaunay-based technique may be used if accuracy and consistency of generated interpolation data are concerns. However, a limitation of the Delaunay technique is that the values at which the function is interpolated must fall within the convex hull of all the available data points. If it does not, an alternate interpolation technique, such as the nearest neighbor, may be used for nearest neighbor interpolation outside of the convex hull.

Another drawback with the Delaunay technique is the marked increase in growth of the computational and storage requirements as the data dimensionality n increases. For example, the available implementations of Delaunay tessellation may not be practical for n>10. The inventor determined that using the Delaunay technique with a Matlab implementation on a personal computer with 4 GB of RAM was adequate storage for values of n<9, and additionally, limiting the data set size. For example, for n=6, approximately 2500 data points may be used, and for n=8, approximately 250 data points may be used. Such data storage requirements may not be well suited for use with higher values of n with the Delaunay technique. A user of Matlab may, for example, use a less accurate nearest neighbor interpolation technique with larger data dimensionality and larger data sets. Additionally, because of the combinatorial nature of the tesselation problem, the computation complexity increases rapidly with the dimension of the data set size making data sets with larger dimensions, such as more than n=11 or n=12, nonscalable for use with existing computer systems.

What will now be described are techniques that may be used in generating data sets based on existing data that may be characterized as non-uniform and scattered in which the generated data is more accurate than that of the nearest neighbor technique, and the storage and computational costs are more scalable than those of the Delaunay technique as the data dimensionality increases.

Described in following paragraphs are techniques in which some advantages of the Delaunay tessellation-based method are retained while simultaneously relaxing excessive computational requirements. As described elsewhere herein, one advantage of the Delaunay tessellation-based interpolation method over the nearest neighbor method is that the Delaunay tessellation-based utilizes information about the local trends contained in the data points that surround the point of interest. In contrast, this information is not utilized within the nearest neighbor method, which uses only one a single value at the nearest data point. The technique described in following paragraphs utilizes this advantage such that described is an interpolation technique in which the interpolated value calculated is based on linear interpolation between the data points surrounding the point of interest. That is, a simplex is determined from selected data points such that the point of interest lies within the interior of the simplex.

The following interpolation technique also relaxes the strict requirement that the surface of the overall interpolated function must be continuous, as in the case of the Delaunay tessellation. The following interpolation technique may select any simplex such that the point of interest x lies within its interior and is close to its vertices. Such simplices may be formed using n+K nearest neighbors of the point of interest. K may be characterized as a parameter selected to limit the number of candidates or points considered herein, K>1. The particular value for K used may vary in accordance with the particular considerations of each embodiment. Among those nearest neighbors, different sets of n+1 points may be used to form candidate simplices. Then a first simplex such that the given point x lies within its interior may be selected to perform linear interpolation. Determining if x lies within a simplex's interior may be performed by expressing x as a linear combination of n vertices of the simplex if the origin of the coordinate system is translated to the remaining n+1$^{th}$ vertex. If this linear combination is convex such that all coefficients are positive and summing to less then 1, then the point lies within the vertices forming the selected simplex.

Figure 1:
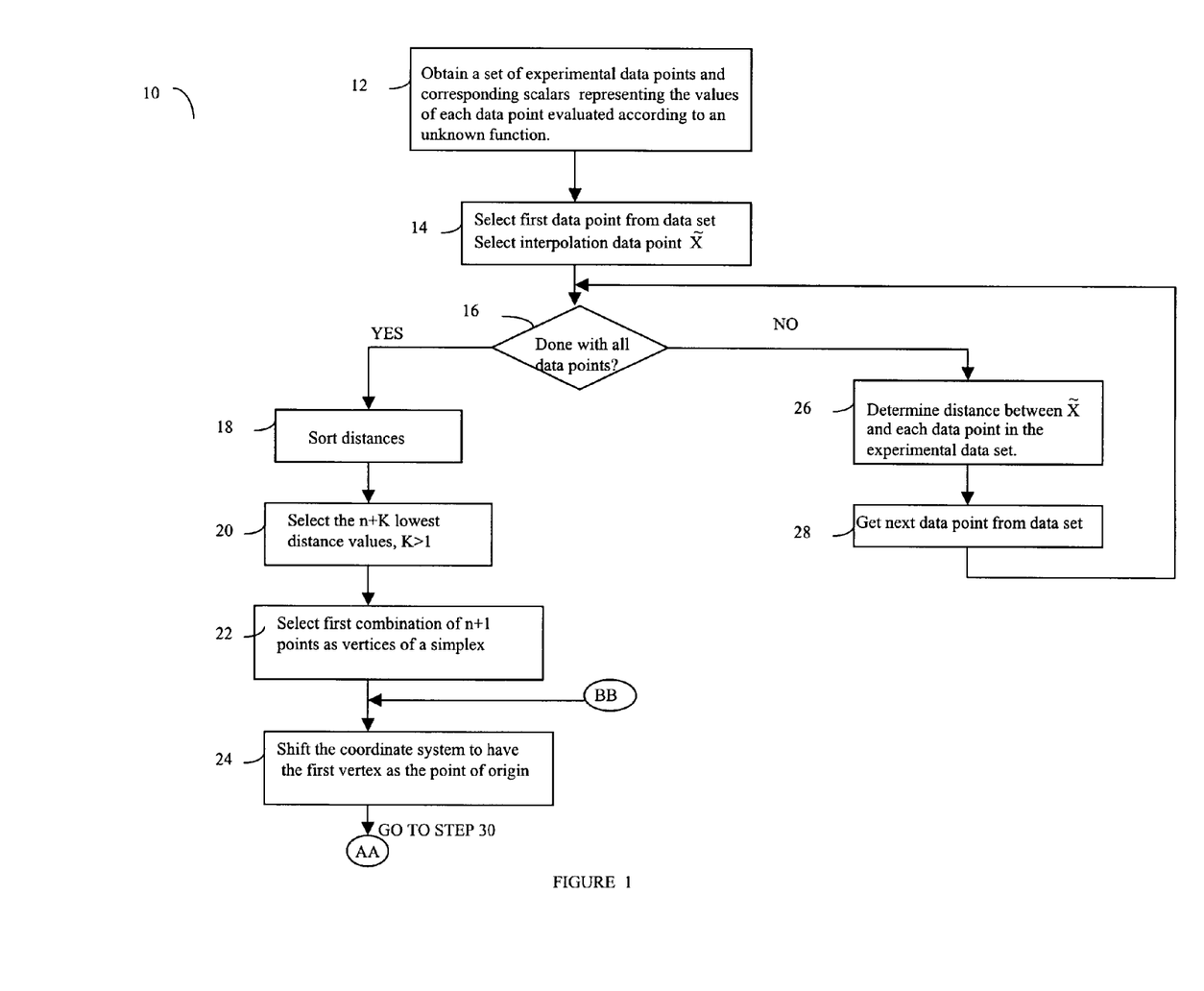
FIGS. 1–2 are steps of a flowchart of one method for performing interpolation.
Figure 2:
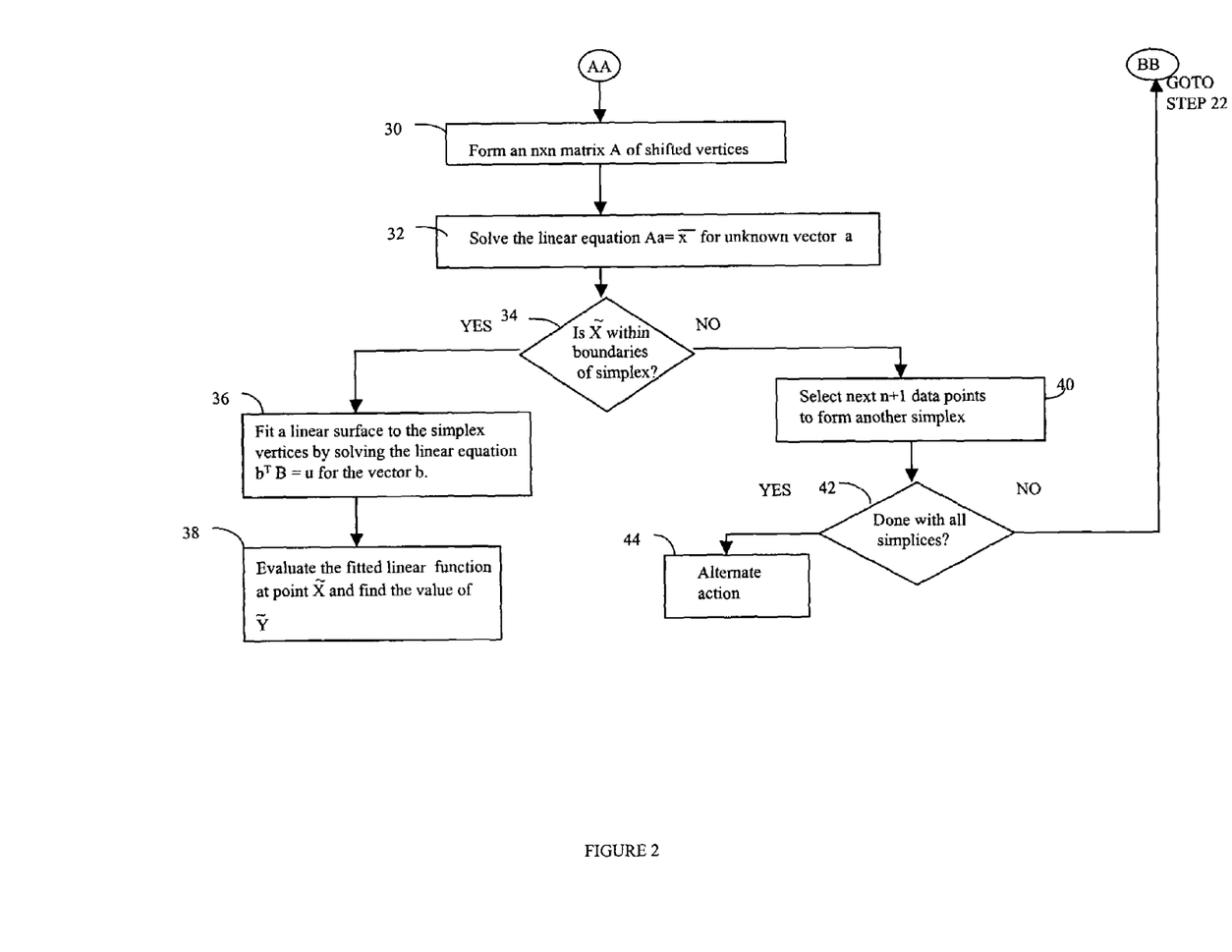

Referring now to FIGS. 1 and 2, shown is a flowchart of steps of an embodiment for performing interpolation. At step 12, a set of experimental data points and corresponding scalar values representing values of the unknown function relating the data points are obtained. This may be represented as a set of data points (x(k), y(k)) k=1, ..., m where x(k) are n-dimensional vectors, and y(k) are the scalars representing values of the unknown function at points x(k). At step 14, a first data point x(k) is selected from the set of experimental data points, and a point $\tilde{x}$ is selected as the interpolation point and represents the point at which an interpolated function value $\tilde{y}$ is approximated. At step 16, a determination is made as to whether all data points x(k) in the experimental data set have been processed. If not, control proceeds to step 26 where a distance $d_k$ between $\tilde{x}$ and every x(k) is determined as:

$$dk = \|\tilde{x} - x(k)\|$$

Control proceeds to step 28 where the next data point in the experimental data set is obtained. Control then proceeds to decision point 16.

If at step 16 it is determined that all data points in the experimental data set have been processed, control proceeds to step 18 where the distances are sorted to determine the n+K lowest values, and the corresponding n+K nearest neighbors of $\tilde{x}$ among all the data points x(k). These n+K nearest neighbors may be denoted as z(i), i=1, ..., n+K, with z(1) being the closest to $\tilde{x}$, z(2) the second closest, and so on.

Control proceeds to step 22 which is the top of a loop for processing each simplex formed by a combination of n+1 data points of the n+K nearest neighbors. This loop is performed for all combinations of n+1 data points of the n+K nearest neighbors. At step 22, the first combination of n+1 data points forming the first simplex are selected. The particular set of vertices of this selected simplex for which the current loop iteration at step 22 is performed is denoted as v(j), i=1, ..., n+1. Control proceeds to step 24 where the origin of the coordinate system of the simplex is shifted such that the first vertex, v(1) is the origin. This is performed by defining for each vertex 2 ... n+1 a shifted vertex denoted as:

$$\bar{v}(j) = v(j) - v(1) \text{ and}$$

defining for the point of interest:

$$\bar{x} = \tilde{x} - v(1)$$

Control proceeds to step 30 where an n×n matrix A is formed from the shifted vertices. The matrix A may be represented as a series of column vectors where each column vector is one of the shifted vertices as:

$$A = [\bar{v}(2), \bar{v}(3), ..., \bar{v}(n+1)]$$

At step 32, the following linear equation is solved for the unknown vector a:

$$Aa = \bar{x}$$

where $\bar{x}$ and A are as defined above. Any one of a variety of different techniques may be used to solve the foregoing linear equation, such as Gaussian elimination, factorization, and the like in accordance with the size of the matrix A.

At step 34, a determination is made as to whether the point of interest is within the boundaries of the selected simplex. This may be performed, for example, by determining if "a" found in step 32 satisfies the following:

$$a_i \geq 0 \text{ and } \Sigma_{i=1}^n a_i \leq 1$$

in which $a_1, ..., a_n$ are the entries in the vector "a".

In this instance, the point of interest $\tilde{x}$ is expressed as a linear combination of n vertices having the origin translated to the remaining n+1th vertex. If this linear combination is determined to be convex, then the point lies within the simplex. Determining whether the linear combination is convex may be performed by determining if all coefficients are positive and sum to less than 1, as set forth above. Other embodiments may use different processing steps to make a determination of step 34.

If the determination at step 34 is such that the point of interest $\tilde{x}$ is not within the simplex or is not on the boundary of the simplex, control proceeds to step 40 where the next combination of n+1 data points is selected to form the vertices of the next simplex to be tested. At step 42, a determination is made as to whether all combinations of points have been processed indicating that all simplices have been tested. If not, control proceeds to step 22 for the next loop iteration using the next selected simplex. If all simplices have been processed, it means that no candidate simplex tested contains $\tilde{x}$, and control proceeds to step 44 to take an alternate action. Alternate actions are discussed in more detail in following paragraphs.

If, at step 34 it is determined that the $\tilde{x}$ is within the simplex or on the boundary of the simplex, control proceeds to step 36 where a linear surface is fit to the simplex vertices by solving the linear equation for a vector "b" of dimension n+1:

$$b^T B = u^T$$

where values of the function at points v(j) are denoted as u(j), j=1 . . . n+1 such that "u" is a vector defined in terms of all the u(j)'s as a transpose matrix:

$$u = [u(1), u(2), \ldots, u(n+1)]^T$$

and B is an n+1×n+1 matrix represented as:

$$B = \begin{bmatrix} v(1) & v(2) & \ldots & v(n+1) \\ 1 & 1 & & 1 \end{bmatrix}$$

As described elsewhere herein, any one of a variety of different techniques may be used to solve the foregoing linear equation in accordance with particulars of the matrix B including, for example, the size of the matrix, whether data included therein is colinear, whether the matrix is singular and the like.

Control proceeds to step 38 where the fitted linear function is evaluated at point x̃. In other words, to obtain the corresponding interpolated value ỹ, the function value at x̃ is approximated as:

$$\tilde{y} = \Sigma_{i=1}^n b_i u_i + b_{n+1}$$

where $b_1, b_2, \ldots b_{n+1}$ are elements of the vector b computed at step 36, and $u_i$ is an ith element of the transpose vector u defined above.

In connection with step 44, alternate actions may be performed in the event that the none of the candidate simplices encloses x̃, or alternatively includes x̃ on the boundary of the simplex. An embodiment may increase the size of K and select a new set of candidate data points, form new simplices and again perform processing of flowchart 10. However, it should be noted that as K increases, the number of possible combinations of n+1 points from among n+K candidates also increases sharply and may utilize an amount of computation time that is impractical. As described elsewhere herein, the foregoing proposed approach for interpolation has a goal of reducing required computational effort. Therefore, it may be preferred to keep the parameter K constant.

An embodiment may also utilize an alternate interpolation technique, such as revert to nearest neighbor interpolation upon failure to determine a suitable simplex fails. The nearest neighbor technique may provide for using the value of y corresponding to data point z(1), the closest neighbor already determined in previous processing steps described elsewhere herein. Other embodiments may use other alternative interpolation techniques besides the nearest neighbor.

Yet another possibility for alternate action taken at step 44 is to perform linear extrapolation using one of the already tested simplices. In other words, it has been determined at step 34 that the data point x̃ is not within the boundaries of a candidate simplex. Accordingly, select the simplex to which the data point x̃ is closest to its interior. In one embodiment, this may be determined by monitoring the degree to which the condition is step 34 is violated and selecting the simplex with the smallest violation such that the point it is close to its interior. In an experimental implementation, the numerical criterion to assess the degree of violation for each vector "a" consisting of elements $a_1, a_2, \ldots, a_n$ is:

$$\max (\max_i(-a_i), \Sigma_{i=1}^n a_i)$$

Other embodiments may use other determinations to assess the degree of violation An embodiment may also select the simplex consisting of the n+1 nearest neighbor data points z(1), z(2), . . . , z(n).

It should be noted that the foregoing are some alternative techniques that may be used in an embodiment and not meant to be an exhaustive list. Other embodiments may include other techniques used alone or in combination with those described herein.

The foregoing interpolation technique assumes that no colinearity exists in the experimental data points. In this instance, the matrices A and/or B are full rank as may be typical of experimental data in which no controls are placed upon generating the values for the experimental data points.

If some regularity is present in the experimental data, for example, if some components of x are controlled and appear in equal intervals, many of the candidate simplices may be degenerate. Accordingly, the method selected to solve the linear equations, such as in steps 32 and 36, may account for the possibility of A and B being singular, or approximately singular depending on the particular precision, for example, of hardware and/or software and numerical computation techniques utilized in an embodiment. An embodiment may include additional test steps prior to solving linear equations to determine of the matrices are singular. If so, appropriate techniques may be used to solve the linear equation. Possible approaches include, for example, using singular value decomposition methods or solving the equations through use of matrix pseudoinverse. Such techniques may be performed in an embodiment, for example, by invoking an available subroutine or function, such as may be available in Matlab, incorporating the functionality to solve the equations.

In the event that the matrices A and/or B are determined to be singular, an embodiment may also add a random "jiggle" factor to the data points to destroy colinearity. This "jiggle factor" may be empirically determined by execution with different values to determine how much a particular jiggle factor affects or varies the data. An embodiment may add a jiggle factor to the data points sufficient to prevent the matrix from being singular but not large enough to practically alter the results.

It should be noted that due to finite numerical accuracy, a failure determination may result from processing at step 34 even though a data point is indeed within a candidate simplex. This depends upon the precision of the data representations in an embodiment. An embodiment may add an error factor to the conditions used in making the step 34 determination to take this into consideration. For example, an embodiment may modify the conditions previously described in step 34 processing to be:

$$a_i - \epsilon_1 \text{ and}$$

$\Sigma_{i=1}^n a_i \leq 1 + \epsilon_2$, with $\epsilon_1$ and $\epsilon_2$ chosen to reflect condition of matrix A. An embodiment may select:

$$\epsilon_1 = n\sqrt{n}\epsilon$$

where $\epsilon$ is based on a processor or hardware and/or software characteristic.

As described above, an embodiment may use distance to select candidate simplex vertices. This may make the foregoing technique sensitive to scaling however. An embodiment may scale data before performing the foregoing interpolation technique so that the ranges of all coordinates of x are the same across the data set.

The foregoing interpolation technique blends advantages of linear interpolation and nearest neighbors approaches. The search for appropriate simplices is greatly simplified when compared to the standard Delaunay-based approach. A simple test is used to test whether the point in question lies inside the candidate simplex. Additionally, the foregoing technique does not require that all simplices be evaluated. Rather, a subset of simplices are evaluated and the foregoing embodiment stops at the first simplex within which it is determined that the desired data point exists. An embodiment may also utilize other techniques for selecting a simplex from the candidate simplices since a single data point may be found to exist within more than one simplex.

The foregoing technique selects the first simplex which contains the point of interest. An embodiment may also use other techniques in selecting a simplex, for example, when there are a plurality of simplices that are determined to enclose, or approximately enclose, the point of interest. For example, an embodiment may perform the processing steps herein until a first predetermined number of simplices are found, until a predetermined number of simplices are examined, until a predetermined time limit has expired, and the like. If there are multiple simplices, an embodiment may accordingly select one of the simplices using any one or more of a variety of evaluation techniques, for example, such as selecting the simplex within which the point of interest is closest to the center of the simplex.

Using the foregoing technique affords the advantage of scalability since the numerical complexity grows at a slower rate than that of the Delaunay method, and the foregoing technique therefore may be used with data sets having dimensions greater than those which are feasible with the Delaunay method. However, the foregoing technique may result in a surface of the overall interpolated function that is also no longer continuous. In addition, the search for a proper simplex may fail, and either linear extrapolation, the nearest neighbor approach, or another alternate action may be taken as described elsewhere herein.

What will now be described is an example of the foregoing technique. It should be noted that although this is a two-dimensional example, the techniques described herein may be applied to other dimensions. In this example, each data point in the database of experimental measurements consists of a two dimensional vector x(k) and the associated measured function value y(k). Suppose there are m=9 data points, given by:

$$x(1) = \begin{bmatrix} 0 \\ 0 \end{bmatrix}, y(1) = 0 \quad x(2) = \begin{bmatrix} 1.5 \\ 3 \end{bmatrix}, y(2) = 6 \quad x(3) = \begin{bmatrix} 0.5 \\ 4 \end{bmatrix}, y(3) = 4$$

$$x(4) = \begin{bmatrix} 3 \\ 5 \end{bmatrix}, y(4) = 17.5 \quad x(5) = \begin{bmatrix} 2 \\ 3 \end{bmatrix}, y(5) = 12 \quad x(6) = \begin{bmatrix} 1.5 \\ 0 \end{bmatrix}, y(6) = 2.0$$

-continued $$x(7) = \begin{bmatrix} 1 \\ 1.5 \end{bmatrix}, y(7) = 2.25 \quad x(8) = \begin{bmatrix} 3 \\ 0 \end{bmatrix}, y(8) = 0 \quad x(9) = \begin{bmatrix} 0 \\ 5 \end{bmatrix}, y(9) = 2.5$$

Figure 4:
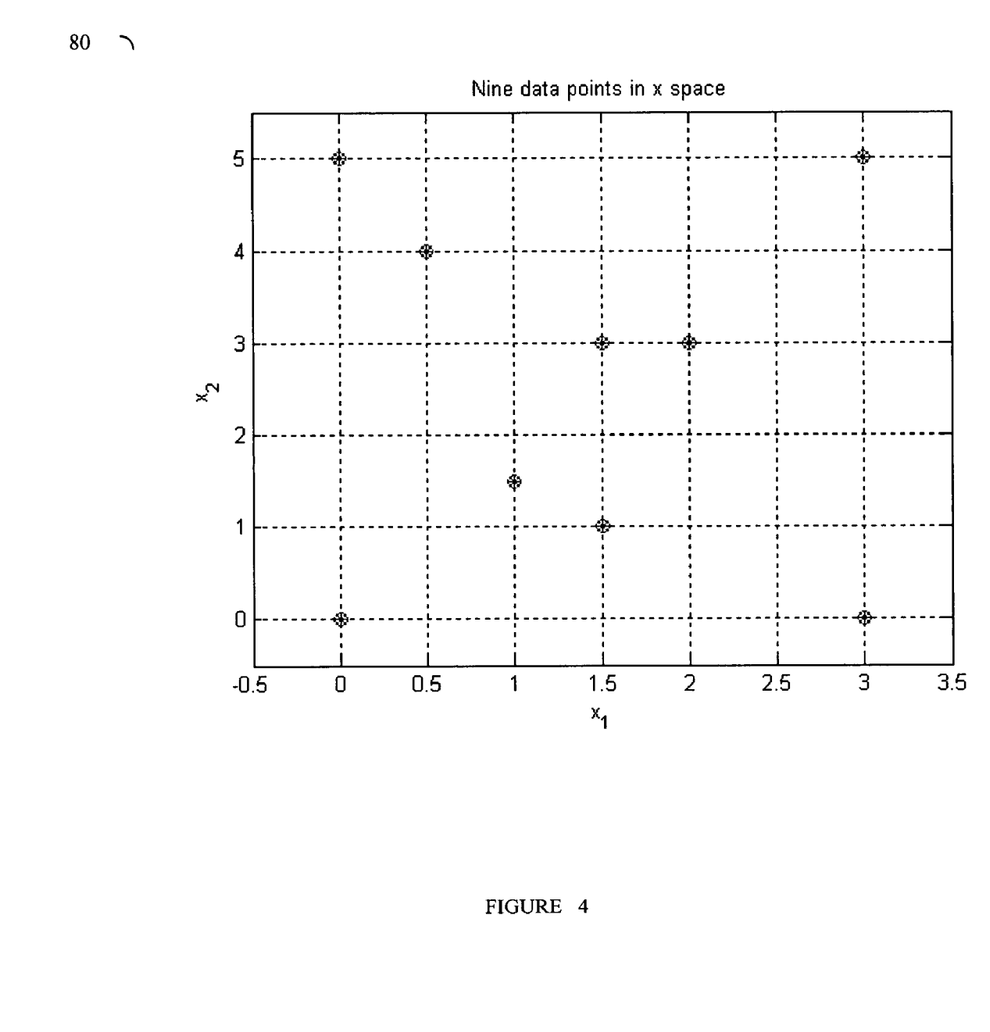
FIGS. 4–7 are graphical representations in connection with an example in which the method steps of FIGS. 1–2 are performed.
Figure 5:
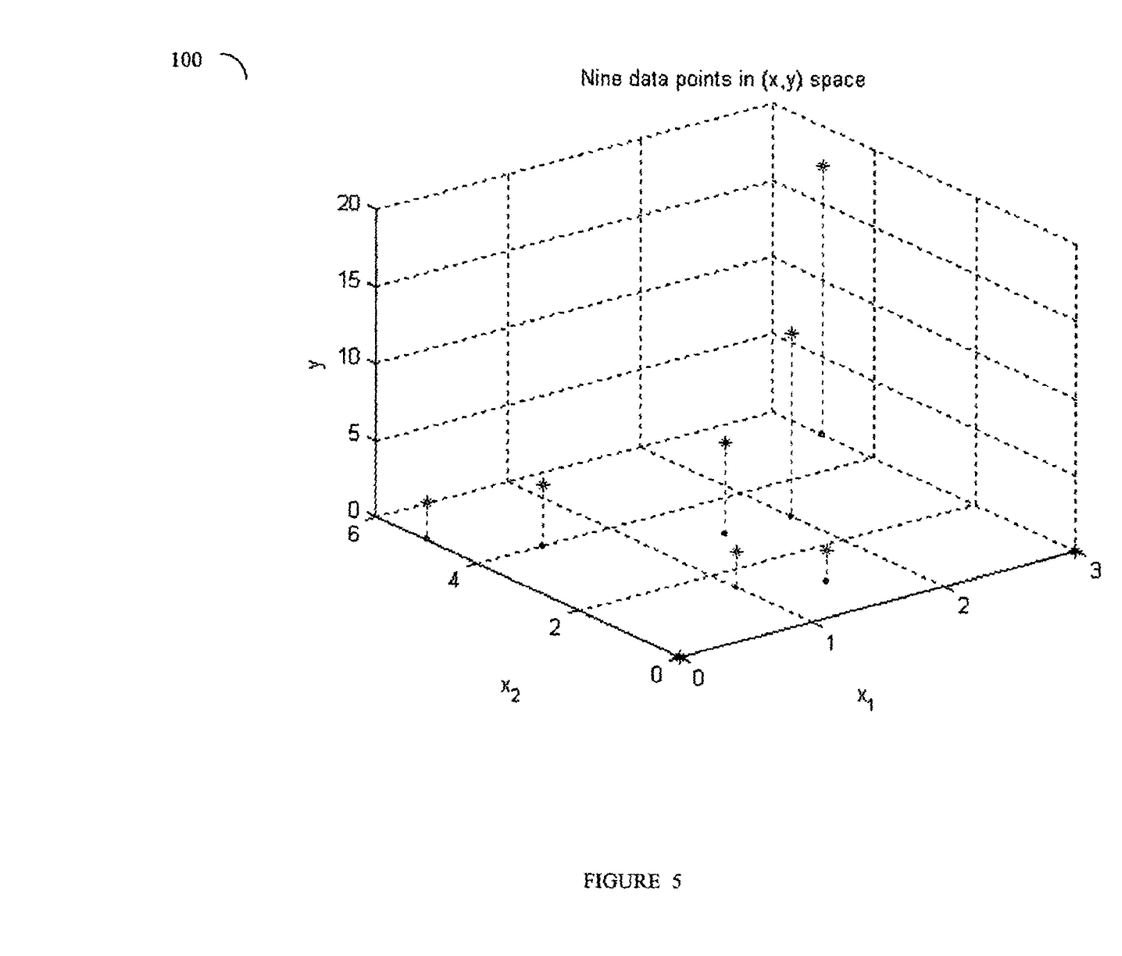

These data points x(k) are depicted in graph 80 of FIG. 4. A three dimensional graph of pairs (x(k), y(k)) is graph 100 of FIG. 5.

Using the foregoing data points, suppose the interpolated function value for $$\tilde{x} = \begin{bmatrix} 1.4 \\ 1.2 \end{bmatrix}$$

is to be computed using the methods steps set forth in the flowchart 10. The parameter K of the interpolation procedure is equal to K=2.

The distance between $\tilde{x}$ and every x(k): $d_k=\|\tilde{x}-x(k)\|$ is determined. These distances for the data points are:

$$d_1 = \|\tilde{x} - x(1)\| = 1.9105 \quad d_2 = \|\tilde{x} - x(2)\| = 1.7029 \quad d_3 = \|\tilde{x} - x(3)\| = 2.8460$$

$$d_4 = \|\tilde{x} - x(4)\| = 4.0311 \quad d_5 = \|\tilde{x} - x(5)\| = 1.8028 \quad d_6 = \|\tilde{x} - x(6)\| = 0.3162$$

$$d_7 = \|\tilde{x} - x(7)\| = 0.4472 \quad d_8 = \|\tilde{x} - x(8)\| = 2.0616 \quad d_9 = \|\tilde{x} - x(9)\| = 3.9560$$

This represents determining the distances described previously in processing steps 16, 26 and 28.

Through partial sorting of distances $d_k$, the n+K=4 lowest values of $d_k$ may be determined, and the corresponding n+K nearest neighbors of $\tilde{x}$ among x(k). The shortest distances among the nine values above are $d_6$, $d_7$, $d_2$, $d_5$. Therefore the four nearest neighbors of $\tilde{x}$ are denoted:

$$z(1) = x(6) = \begin{bmatrix} 1.5 \\ 1 \end{bmatrix} \quad z(2) = x(7) = \begin{bmatrix} 1 \\ 1.5 \end{bmatrix}$$

$$z(3) = x(2) = \begin{bmatrix} 1.5 \\ 3 \end{bmatrix} \quad z(4) = x(5) = \begin{bmatrix} 2 \\ 3 \end{bmatrix}$$

This represents processing of steps 18 and 20 as described in flowchart 10.

Iterations are performed over all combinations of n+1=3 points from among the n+K=4 selected nearest neighbors. The iterations are over the loop including the steps 24, 30, 32, and 34. In this case there are four such triples: (z(1), z(2), z(3)), (z(1), z(2), z(4)), (z(1), z(3), z(4)), (z(2), z(3), z(4)). Each of these triples are tested until it is determined that one form a simplex that encloses the point $\tilde{x}$. If there is no such triple, then alternate action may be taken as described elsewhere herein in connection with step 44.

For the first iteration, a first simplex, which in this instance is a triangle, has the following vertices:

$$v(1) = z(1) = \begin{bmatrix} 1.5 \\ 1 \end{bmatrix} \quad v(2) = z(2) = \begin{bmatrix} 1 \\ 1.5 \end{bmatrix} \quad v(3) = z(3) = \begin{bmatrix} 1.5 \\ 3 \end{bmatrix}$$

The origin of the coordinate system is shifted to v(1), as set forth in step 24. The vertices of the simplex with this new origin are:

$$\bar{v}(1) = v(1) - v(1) = \begin{bmatrix} 0 \\ 0 \end{bmatrix} \quad \bar{v}(2) = v(2) - v(1) = \begin{bmatrix} -0.5 \\ 0.5 \end{bmatrix}$$

$$\bar{v}(3) = v(3) - v(1) = \begin{bmatrix} 0 \\ 2 \end{bmatrix}$$

Additionally, the point at which interpolation is desired now becomes $$\bar{x} = \tilde{x} - v(1) = \begin{bmatrix} -0.1 \\ 0.2 \end{bmatrix}$$

As in step 30, an n by n matrix $$A = [v(2), v(3), K, v(n+1)] = [v(2), v(3)] = \begin{bmatrix} -0.5 & 0 \\ 0.5 & 2 \end{bmatrix}$$

is formed.

As in step 32, the linear equation $A a = \bar{x}$ is solved for the unknown vector a. The solution in this example is $$a = \begin{bmatrix} 0.2 \\ 0.05 \end{bmatrix}$$

In performing the determination if the point $\tilde{x}$ is within the boundaries of the simplex at step 34, it is determined if all components of a satisfy $a_i \geq 0$ and $\Sigma_{i=1}^{n} a_i = 0.25 \leq 1$. In this example, it is determined that the point $\tilde{x}$ lies inside the triangle formed by vertices $\bar{v}(1), \bar{v}(2), \bar{v}(3)$, or equivalently that the point $\tilde{x}$ lies inside the triangle formed by vertices $v(1), v(2), v(3)$. The YES branch of step 34 is followed and control proceeds to step 36. Otherwise, if $\tilde{x}$ is determined not to be inside the simplex, control would have proceeds to step 40 for iteration 2 with the simplex v(1)=z(1), v(2)=z(2), v(3)=z(4)).

In connection with processing of step 36, values of the function at points v(j) are denoted as u(j), that is u(1)=2, u(2)=2.25, u(3)=6. In this instance, the following vector is formed:

$$u = \begin{bmatrix} 2 \\ 2.25 \\ 6 \end{bmatrix}$$

An n+1 by n+1 matrix is also formed as:

$$B = \begin{bmatrix} v(1) & v(2) & v(3) \\ 1 & 1 & 1 \end{bmatrix} = \begin{bmatrix} 1.5 & 1 & 1.5 \\ 1 & 1.5 & 3 \\ 1 & 1 & 1 \end{bmatrix}$$

The vector u and the matrix B are used in solving the linear equation $b^T B = U^T$ for the unknown vector b. In this example, the result is $$b = \begin{bmatrix} 1.5 \\ 2 \\ -2.25 \end{bmatrix}$$

Processing continues with step 38 where the fitted linear function is evaluated at point $\tilde{x}$ to find the required value: $\tilde{y} = \Sigma_{i=1}^{n} b_i \tilde{x}_i + b_{n+1} = 1.5*1.4 + 2*1.2 - 2.25 = 2.25$.

Figure 6:
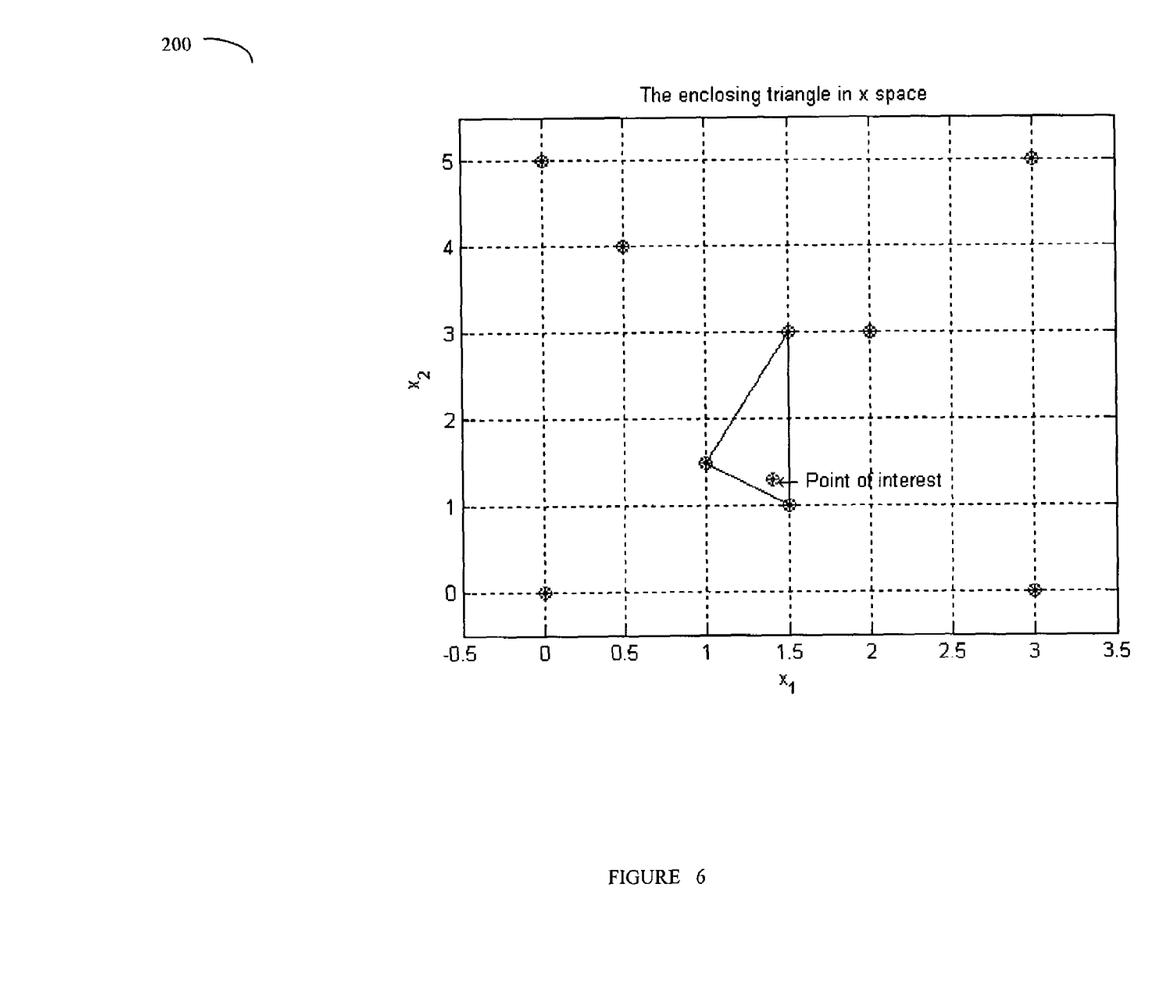
Figure 7:
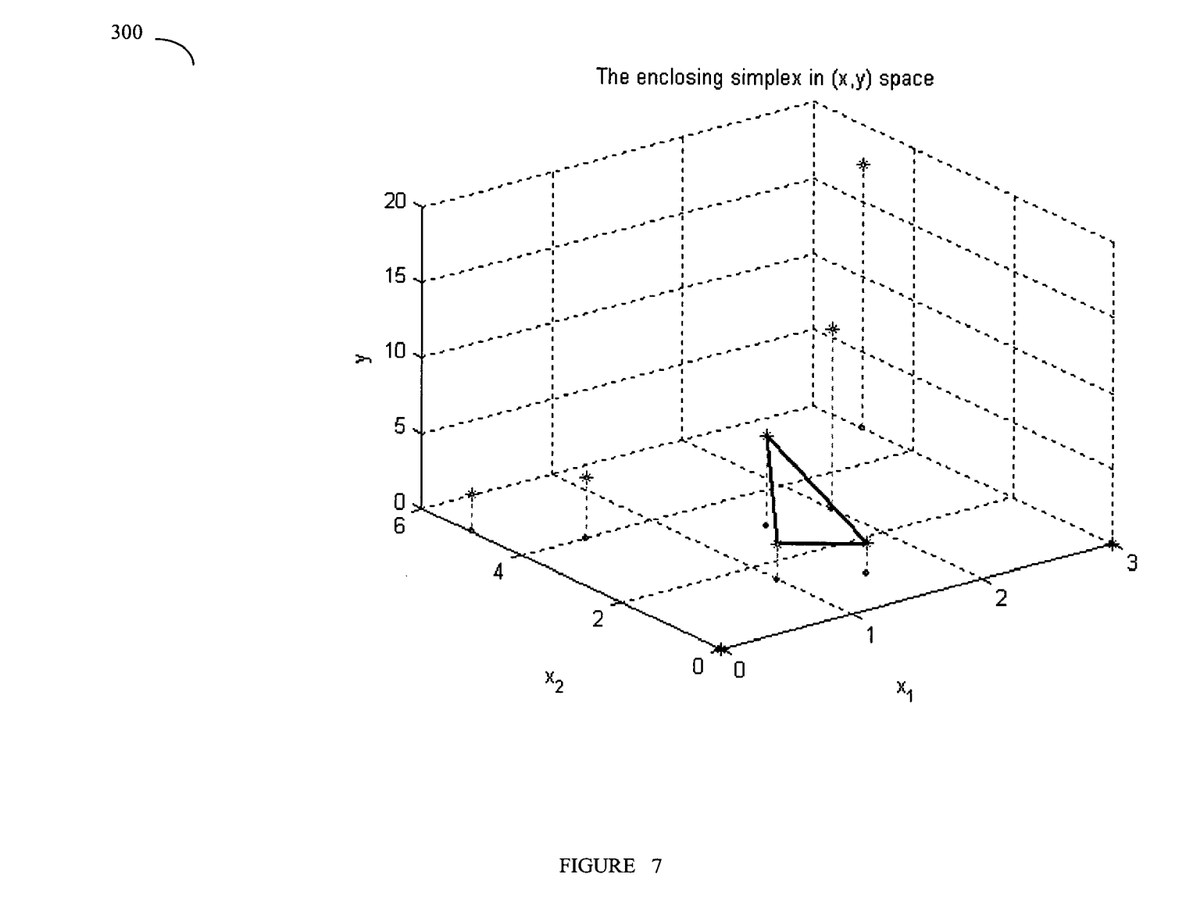

The final result of the interpolation procedure is that the interpolated function value at point $\tilde{x}$ is $f(\tilde{x}) = \tilde{y} = 2.25$. The simplex (triangle) that includes the point of interest $\tilde{x}$ is shown in the graph 200 of FIG. 6. The interpolating surface in the three-dimensional space is depicted in the graph 300 of FIG. 7.

Figure 8:
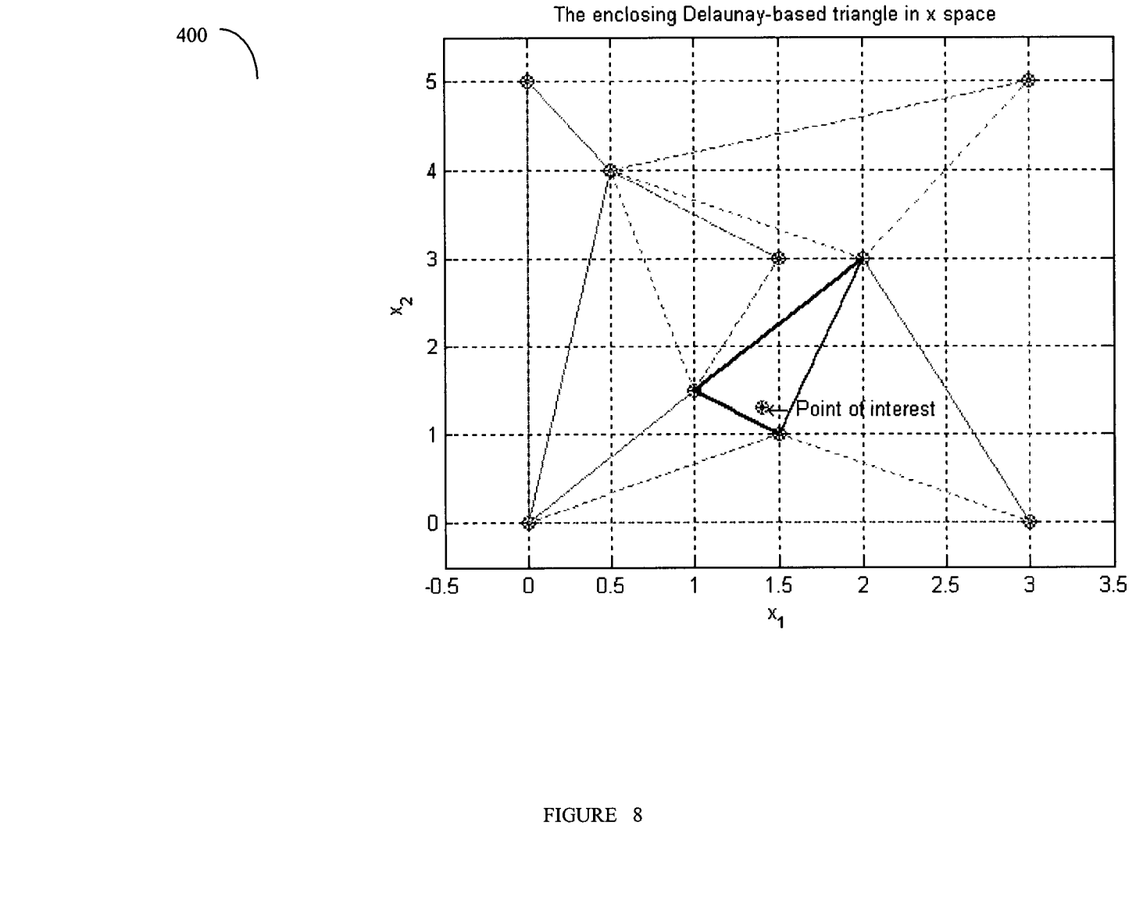
FIG. 8 is a graphical representation of a selected simplex for a point when the Delaunay technique is performed for the same point of interest as selected in the example of FIGS. 4–7.

Contrasting the foregoing technique with the Delaunay-based interpolation, the graph 400 of FIG. 8 shows the Delaunay triangulation of this data set with the enclosing triangle outlined. Note that the Delaunay technique selected a different triangle than the one described herein and the simplex selected by the Delaunay technique includes vertices that are not the three nearest neighbors of $\tilde{x}$.

Use of linear interpolation on this triangle leads to the function value $\tilde{y}2.46$. It should be noted that this resulting value is higher than the resulting interpolated value produced using the technique described herein. This illustrates the fact that with different choices of the enclosing triangle or other simplex, the interpolated function value may vary.

Figure 3:
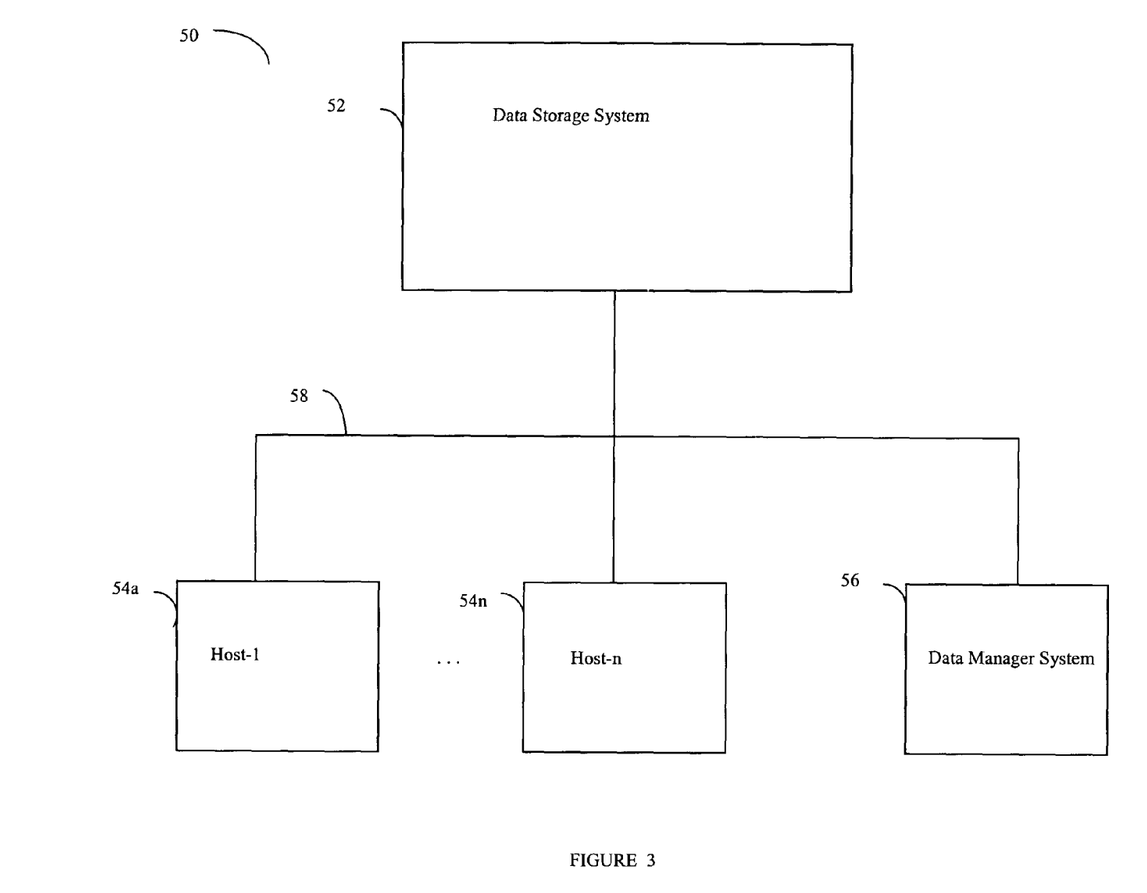
FIG. 3 is an example of an embodiment of a computer system in which the method steps of FIGS. 1–2 may be performed.

Referring now to FIG. 3, shown is an example of an embodiment of a computer system in which the foregoing interpolation technique may be executed. The computer system 50 includes a data storage system 52 connected to host systems 54a–54n, and a data manager system 56 through communication medium 58. In this embodiment of the computer system 50, the N hosts 54a–54n and the data manager system 56 may access the data storage system 52, for example, in performing input/output (I/O) operations or data requests. The communication medium 58 may be any one of a variety of networks or other type of communication connections as known to those skilled in the art. The communication medium 58 may be a network connection, bus, and/or other type of data link, such as a hardwire or other connections known in the art. For example, the communication medium 58 may be the Internet, an intranet, network or other connection(s) by which the host systems 54a–54n, and the data manager system may access and communicate with the data storage system 52, and may also communicate with others included in the computer system 50.

Each of the host systems 54a–54n, the data manager system 56, and the data storage system 52 included in the computer system 50 may be connected to the communication medium 58 by any one of a variety of connections as may be provided and supported in accordance with the type of communication medium 58. The processors included in the host computer systems 54a–54n and the data manager system 56 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 54a–54n and the data manager system 56, as well as those components that may be included in the data storage system 52 are described herein in more detail, and may vary with each particular embodiment. Each of the host computers 54a–54n, as well as the data manager system 56, may all be located at the same physical site, or, alternatively, may also be located in different physical locations. Examples of the communication medium that may be used to provide the different types of connections between the host computer systems, the data manager system, and the data storage system of the computer system 50 may use a variety of different communication protocols such as SCSI, ESCON, Fibre Channel, or GIGE (Gigabit Ethernet), and the like. Some or all of the connections by which the hosts, data manager system 56 and data storage system 52 may be connected to the communication medium 58 may pass through other communication devices, such as a Connectrix or other switching equipment that may exist such as a phone line, a repeater, a multiplexer or even a satellite.

Each of the host computer systems as well as the data manager system may perform different types of data operations in accordance with different tasks executing in each of the hosts. In the embodiment of FIG. 3, any one or more of the host computers 54a–54n may be executing instructions to perform the foregoing interpolation techniques. The host may subsequently issue a data request to the data storage system 52 to perform a data operation, for example, to retrieve experimental data and/or store generated interpolated data.

The data storage system may include any one or more data storage devices ranging from, for example, a single disk drive to a networked plurality of different types of data storage devices.

The instructions that may be executed by processors included in the host computers may be stored in any combination of hardware and/or software including, for example, machine executable instructions input from a read-only-memory (ROM), machine-language instructions stored on a data storage device in which the machine-language instructions have been generated using a language processor, software package, and the like.

Although the foregoing techniques may be used in connection with generating training data sets for use with neural networks using limited experimental data characterized as scattered and non-uniform, these same interpolation techniques may also be utilized with input data characterized as uniform. The foregoing interpolation techniques may use as input the limited experimental data to produce a more complete training data set uniformly covering a desired ranged of expected inputs. The neural networks may, for example, be used in connection with performing data fusion. The foregoing interpolation techniques are scalable for use with models having higher dimensions without incurring the limitations, such as associated computational and storage costs, that may be associated with existing techniques. The techniques described herein may also be used in generating data sets for verification of neural networks trained with limited experimental data. The interpolation techniques described herein are generally applicable for use with other applications in which existing interpolation techniques may be used to generate additional and more complete data.

One application of the foregoing techniques may be in an embodiment used to train a neural network. In one embodiment, a neural network may be trained to perform sensor fusion techniques using data generated with techniques as described herein. The neural network may be trained to estimate a quantity Y out of obtained measurements X1 . . . Xn. The quantity Y being estimated may be, for example, an estimate of helicopter gross weight based on measured flight parameters. The helicopter gross weight may be determined, for example, as a sum of weights of an airframe, fuel, people, cargo, and the like. The measured flight parameters may include, for example, velocity, flight altitude, engine torque, and the like. In one embodiment, the independent variables may be the sensor measurements and the dependent variables may be the helicopter gross weight. In this application, the experimental data set may be smaller than desired to properly train the neural network. The experimental data may also, for example, include only discrete values of parameters of interest, such as, for example, flights at velocities of 100, 120, 140 and 160 knots. Obtaining data sets providing larger, more complete coverage may be costly, for example, since helicopter flights are expensive. To properly train the neural network, it may be desired to provide greater variability of the parameters in their entire range, for example, to avoid abnormal "oscillatory" behavior of the network in between training points. The experimental data set may be used with the techniques described herein to populate the input space with artificially created data points to ensure that the trained response between the actual measurement points behaves. The foregoing techniques described herein may be used to address overtraining by creating an intermediate model of the data using the interpolation techniques described herein and then accordingly training the neural network.

In another application, an embodiment may use the foregoing techniques in neural network verification. For example, as described in U.S. Pat. No. 6,473,746, which is incorporated by reference herein, a uniform grid of test points is used to verify the neural network. If such a uniform grid of test points is not available, the foregoing techniques described herein may be used to generate needed test points from available data points, which may be characterized as scattered. Use of such a uniform grid of test points may be desirable for neural network verification.

While the invention has been disclosed in connection with various embodiments, modifications thereon will be readily apparent to those skilled in the art. Accordingly, the spirit and scope of the invention is set forth in the following claims.

What is claimed is:

1. A computer-implemented method for performing interpolation of a point of interest producing an approximated function value of said point of interest using an input data set comprising:
   determining distances between said point of interest and points in said input data set;
   sorting said distances;
   selecting a predetermined number of points in said input data set which are closest to said point of interest in accordance with said distances;
   determining whether said point of interest is one of: enclosed within a simplex and on a boundary of the simplex, said simplex formed by a combination of n+1 points selected from said predetermined number of points, said n+1 points forming vertices of said simplex, n being a dimension of points in said input data set;

if there is a simplex enclosing said point of interest or including said point of interest on its boundary, fitting a linear surface to said vertices of said simplex in accordance with a linear function, and evaluating said linear function at said point of interest to determine said approximated function value representing the approximation of said linear function at said point of interest; and using at least a portion of said input data set, said point of interest and said approximated function value for at least one of: training and verification of a neural network.

2. The method of claim 1, further comprising:
examining combinations of n+1 points selected from said predetermined number of points to form candidate simplices.

3. The method of claim 2, further comprising:
determining that there is at least one simplex of said candidate simplices that either enclose said point of interest or include said point of interest on a boundary thereof.

4. The method of claim 2, further comprising, for each of said candidate simplices:
shifting a coordinate system of said each candidate simplex to have a first vertex v(1) of said each candidate simplex as a point of origin;

forming an n×n matrix A represented as:

$$A = [\bar{v}(2), \bar{v}(3), \ldots, \bar{v}(n+1)]$$

wherein each $\bar{v}(j)$ represents a shifted vertex corresponding to an original vertex shifted in accordance with said point of origin v(1), for each vertex v(j), j=2, ..., n+1, said shifted vertex for each vertex j, j=2 ... n+1 denoted as:

$$\bar{v}(j) = v(j) - v(1) \text{ and}$$

defining for the point of interest a corresponding shifted point of interest:

$$\bar{x} = \tilde{x} - v(1)$$

where $\tilde{x}$ represents said point of interest; and
solving a linear equation $Aa = \bar{x}$ for unknown vector "a".

5. The method of claim 4, further comprising:
determining whether said point of interest is one of: enclosed within said each candidate simplex and included on a boundary of said each candidate simplex, by determining if the vector "a" satisfies:

$$a_i \geq 0 \text{ and } \Sigma_{i=1}^n a_i \leq 1$$

in which $a_1, \ldots a_n$ are entries in the vector "a".

6. The method of claim 5, further comprising:
fitting a linear surface to vertices of at least one of said each candidate simplices by solving a linear equation:

$$b^T B = u^T \text{ for "b",}$$

where values of said linear function at points v(j) are denoted as u(j), j=1 ... n+1 such that "u" is a vector defined in terms of all the u(j)'s as a transpose matrix:

$$u = [u(1), u(2), \ldots, u(n+1)]^T$$

and B is an n+1 by n+1 matrix represented as:

$$B = \begin{bmatrix} v(1) & v(2) & \ldots & v(n+1) \\ 1 & 1 & & 1 \end{bmatrix}.$$

7. The method of claim 6, further comprising:
determining if said input data set is colinear; and
if said input data set is colinear, adding a predetermined value to said input data such that a resulting input data set is not colinear.

8. The method of claim 2, further comprising:
determining that none of said candidate simplices includes said point of interest such that said point of interest is notenclosed by a candidate simplex and is not on a boundary thereof.

9. The method of claim 8, further comprising:
performing an alternate action.

10. The method of claim 9, wherein said alternate action is at least one of: an alternate interpolation technique, increasing said predetermined number of points, and performing linear extrapolation.

11. The method of claim 9, wherein said alternate action is performing linear extrapolation, and said method further comprising:
forming a simplex having n+1 vertices that are the n+1 nearest neighbors of said point of interest.

12. The method of claim 9, wherein said alternate action is performing linear extrapolation, and said method further comprising:
selecting a simplex from said candidate simplices having a smallest violation of all said candidate simplices.

13. The method of claim 1, wherein, said determining whether said point of interest is one of: enclosed within a simplex and included on a boundary of the simplex comprises:
expressing said point of interest as a linear combination of n vertices of said simplex having translated coordinates with vertex "n+1" of the simplex as a point of origin; and
determining if said linear combination is convex.

14. The method of claim 13, wherein said determining if said linear combination is convex further comprises:
determining if all coefficients of said linear combination are positive and sum to less than 1.

15. The method of claim 1, wherein said input data set is non-uniform.

16. The method of claim 1, wherein said input data set is not colinear.

17. The method of claim 1, wherein said neural network is trained to perform sensor fusion techniques, and said approximated function value is included in training data that is used to train the neural network and covers a desired range of expected inputs.

18. The method of claim 1, wherein the neural network is trained to estimate helicopter gross weight based on measured flight parameters.

19. The method of claim 1, wherein the neural network is verified using a uniform grid of test points, and said approximated function value is one of the test points included in the uniform grid.

20. A computer program product for performing interpolation of a point of interest producing an approximated function value of said point of interest using an input data set comprising:

executable code that determines distances between said point of interest and points in said input data set;

executable code that sorts said distances;

executable code that selects a predetermined number of points in said input data set which are closest to said point of interest in accordance with said distances;

executable code that determines whether said point of interest is one of: enclosed within a simplex and on a boundary of the simplex, said simplex formed by a combination of n+1 points selected from said predetermined number of points, said n+1 points forming vertices of said simplex, n being a dimension of points in said input data set;

executable code that, if there is a simplex enclosing said point of interest or including said point of interest on its boundary, fits a linear surface to said vertices of said simplex in accordance with a linear function, and evaluating said linear function at said point of interest to determine said approximated function value representing the approximation of said linear function at said point of interest; and executable code that uses at least a portion of said input data set, said point of interest and said approximated function value for at least one of: training and verification of a neural network.

21. The computer program product of claim 20, further comprising:

executable code that examines combinations of n+1 points selected from said predetermined number of points to form candidate simplices.

22. The computer program product of claim 21, further comprising:

executable code that determines that there is at least one simplex of said candidate simplices that either enclose said point of interest or include said point of interest on a boundary thereof.

23. The computer program product of claim 21, further comprising, executable code that, for each of said candidate simplices:

shifts a coordinate system of said each candidate simplex to have a first vertex v(1) of said each candidate simplex as a point of origin;

forms an n×n matrix A represented as:

$$A = [\bar{v}(2), \bar{v}(3), \ldots, \bar{v}(n+1)]$$

wherein each $\bar{v}(j)$ represents a shifted vertex corresponding to an original vertex shifted in accordance with said point of origin v(1), for each vertex v(j), j=2, ..., n+1, said shifted vertex for each vertex j, j=2 ... n+1 denoted as:

$$\bar{v}(j) = v(j) - v(1) \text{ and}$$

defines for the point of interest a corresponding shifted point of interest:

$$\bar{x} = \tilde{x} - v(1)$$

where $\tilde{x}$ represents said point of interest; and solves a linear equation $A a = \bar{x}$ for unknown vector "a".

24. The computer program product of claim 23, further comprising:

executable code that determines whether said point of interest is one of: enclosed within said each candidate simplex and included on a boundary of said each candidate simplex, by determining if the vector "a" satisfies:

$$a_i \geq 0 \text{ and } \Sigma_{i=1}^n a_i \leq 1$$

in which $a_1, \ldots a_n$ are entries in the vector "a".

25. The computer program product of claim 24, further comprising:

executable code that fits a linear surface to vertices of at least one of said each candidate simplices by solving a linear equation:

$$b^T B = u^T \text{ for "b"},$$

where values of said linear function at points v(j) are denoted as u(j), j=1 ... n+1 such that "u" is a vector defined in terms of all the u(j)'s as a transpose matrix:

$$u = [u(1), u(2), \ldots, u(n+1)]^T$$

and B is an n+1 by n+1 matrix represented as:

$$B = \begin{bmatrix} v(1) & v(2) & \ldots v(n+1) \\ 1 & 1 & 1 \end{bmatrix}.$$

26. The computer program product of claim 25, further comprising:

executable code that determines if said input data set is colinear; and executable code that, if said input data set is colinear, adds a predetermined value to said input data such that a resulting input data set is not colinear.

27. The computer program product of claim 21, further comprising:

executable code that determines that none of said candidate simplices includes said point of interest such that said point of interest is not enclosed by a candidate simplex and is not on a boundary thereof.

28. The computer program product of claim 27, further comprising:

executable code that performs an alternate action.

29. The computer program product of claim 28, wherein said alternate action is at least one of: an alternate interpolation technique, increasing said predetermined number of points, and performing linear extrapolation.

30. The computer program product of claim 28, wherein said alternate action is performing linear extrapolation, and said computer program product further comprising:

executable code that selects a simplex from said candidate simplices having a smallest violation of all said candidate simplices.

31. The computer program product of claim 28, wherein said alternate action is performing linear extrapolation, and said computer program product further comprising:

executable code that forms a simplex having n+1 vertices that are the n+1 nearest neighbors of said point of interest.

32. The computer program product of claim 20, wherein, said executable code that determines whether said point of interest is one of: enclosed within a simplex and included on a boundary of the simplex comprises:

executable code that expresses said point of interest as a linear combination of n vertices of said simplex having translated coordinates with vertex "n1" of the simplex as a point of origin; and executable code that determines if said linear combination is convex.

33. The computer program product of claim 32, wherein said executable code that determines if said linear combination is convex further comprises:

executable code that determines if all coefficients of said linear combination are positive and sum to less than 1.

34. The computer program product of claim 20, wherein said input data set is non-uniform.

35. The computer program product of claim 20, wherein said input data set is not colinear.

36. The computer program product of claim 20, wherein said neural network is trained to perform sensor fusion techniques, and said approximated function value is included in training data that is used to train the neural network and covers a desired range of expected inputs.

37. The computer program product of claim 20, wherein the neural network is trained to estimate helicopter gross weight based on measured flight parameters.

38. The computer program product of claim 20, wherein the neural network is verified using a uniform grid of test points, and said approximated function value is one of the test points included in the uniform grid.

* * * * *